United States Patent
López Estévez et al.

(10) Patent No.: US 12,064,068 B2
(45) Date of Patent: Aug. 20, 2024

(54) VISION SYSTEM FOR A MOBILE ROBOT

(71) Applicant: Dyson Technology Limited, Wiltshire (GB)

(72) Inventors: Miguel López Estévez, Bristol (GB); Hossein Farid Ghassem Nia, Swindon (GB); Marco Zenti, Bristol (GB); David Andrew Richards, Sydney (AU); David Finlay Wyatt, Gloucester (GB)

(73) Assignee: Dyson Technology Limited, Malmesbury (GB)

( * ) Notice: Subject to any disclaimer, the term of this patent is extended or adjusted under 35 U.S.C. 154(b) by 902 days.

(21) Appl. No.: 16/972,398

(22) PCT Filed: May 8, 2019

(86) PCT No.: PCT/GB2019/051263
§ 371 (c)(1),
(2) Date: Dec. 4, 2020

(87) PCT Pub. No.: WO2019/234383
PCT Pub. Date: Dec. 12, 2019

(65) Prior Publication Data
US 2021/0228047 A1 Jul. 29, 2021

(30) Foreign Application Priority Data
Jun. 5, 2018 (GB) .................................. 1809178

(51) Int. Cl.
*A47L 11/40* (2006.01)
*A47L 9/00* (2006.01)
(Continued)

(52) U.S. Cl.
CPC ........... *A47L 11/4011* (2013.01); *A47L 9/009* (2013.01); *B25J 9/1697* (2013.01);
(Continued)

(58) Field of Classification Search
None
See application file for complete search history.

(56) References Cited

U.S. PATENT DOCUMENTS 9,864,914 B2 1/2018 Kim et al.
10,144,342 B2 12/2018 Ji et al.
(Continued)

FOREIGN PATENT DOCUMENTS

CN 206223332 U 6/2017
EP 2631730 A1 8/2013
(Continued)

OTHER PUBLICATIONS

Office Action received for Chinese Patent Application No. 201980035349.X, mailed on Sep. 26, 2023, 19 pages (10 pages of English Translation and 9 pages of Original Document).
(Continued)

*Primary Examiner* — Hung Q Dang
(74) *Attorney, Agent, or Firm* — Tucker Ellis LLP; Michael G. Craig

(57) ABSTRACT

A vision system for a mobile robot, the vision system including: a lens module; an illumination system including a plurality of light sources; and a lens module holder. The lens module holder is positioned around the lens module and includes a reflective surface for reflecting light emitted from the illumination system away from the lens module.

15 Claims, 10 Drawing Sheets

(51) Int. Cl.
*B25J 9/16* (2006.01)
*B25J 11/00* (2006.01)
*B25J 19/00* (2006.01)
*B25J 19/02* (2006.01)
*G02B 7/02* (2021.01)
*G05D 1/00* (2024.01)

(52) U.S. Cl.
CPC ....... *B25J 11/0085* (2013.01); *B25J 19/0054* (2013.01); *G02B 7/021* (2013.01); *A47L 2201/04* (2013.01)

(56) References Cited

U.S. PATENT DOCUMENTS

| | | | |
|---|---|---|---|
| 2003/0089776 A1* | 5/2003 | Hennick | H05K 1/189 235/454 |
| 2006/0041333 A1 | 2/2006 | Anezaki | |
| 2006/0203875 A1* | 9/2006 | Frenzel | H01L 31/0203 257/E31.127 |
| 2007/0118018 A1* | 5/2007 | Gilad | A61B 1/00181 600/176 |
| 2007/0232852 A1* | 10/2007 | Pascal | A61B 1/051 600/109 |
| 2009/0245766 A1* | 10/2009 | Sasaki | G03B 17/08 396/25 |
| 2013/0331990 A1 | 12/2013 | Jeong et al. | |
| 2014/0002676 A1* | 1/2014 | Ning | G03B 17/14 235/375 |
| 2015/0120056 A1 | 4/2015 | Noh et al. | |
| 2015/0326766 A1* | 11/2015 | Czepowicz | H04N 23/54 348/360 |
| 2016/0059770 A1 | 3/2016 | Ji et al. | |
| 2016/0205318 A1* | 7/2016 | Wang | H04N 23/51 348/36 |
| 2017/0331987 A1* | 11/2017 | Kimura | H04N 23/55 |
| 2020/0154980 A1* | 5/2020 | Ben-Arye | A61B 1/0684 |

FOREIGN PATENT DOCUMENTS

| | | |
|---|---|---|
| EP | 2672287 A1 | 12/2013 |
| GB | 2529846 B | 2/2019 |
| JP | 2000-337887 A | 12/2000 |
| JP | 2005-324297 A | 11/2005 |
| JP | 2006-514308 A | 4/2006 |
| JP | 2010-526416 A | 7/2010 |
| JP | 2013-252431 A | 12/2013 |
| JP | 2015-76872 A | 4/2015 |
| JP | 2018-500624 A | 1/2018 |
| KR | 10-0860874 B1 | 9/2008 |
| KR | 10-2016-0078063 A | 7/2016 |
| KR | 10-2017-0047382 A | 5/2017 |
| WO | 2013-183955 A1 | 12/2013 |

OTHER PUBLICATIONS

International Search Report and Written Opinion dated Aug. 21, 2019, directed to International Application No. PCT/GB2019/051263; 12 pages.

Search Report dated Nov. 11, 2018, directed to GB Application No. 1809178.5; 1 page.

Office Action received for Korean Patent Application No. 10-2020-7034167, mailed on Jan. 21, 2022, 10 pages (5 pages of English Translation and 5 pages of Original Document).

Office Action received for Japanese Patent Application No. 2020-567087, mailed on Jan. 11, 2022, 6 pages (3 pages of English Translation and 3 pages of Original Document).

* cited by examiner

VISION SYSTEM FOR A MOBILE ROBOT

CROSS-REFERENCE TO RELATED APPLICATIONS

This application is a national stage application under 35 USC 371 of International Application No. PCT/GB2019/051263, filed May 8, 2019, which claims the priority of United Kingdom Application No. 1809178.5, filed Jun. 5, 2018, the entire contents of each of which are incorporated herein by reference.

FIELD OF THE DISCLOSURE

The present invention relates to a vision system for a mobile robot.

BACKGROUND OF THE DISCLOSURE

Mobile robots such as vacuum cleaner robots are increasingly adopting vision systems to help them navigate and understand their environments. Using a vision system has many benefits, such as allowing the robot to better understand the environment in which it is located, and allowing for a structured travel paths. However, one drawback to the use of vision systems is that they do not perform well in low-light conditions. As a result, mobile robots which use vision systems often need illumination systems, or headlights, to improve the quality of the images captured by the vision system.

An example of a robot with an illumination system is described in GB2529846. In this example, the mobile robot comprises lights that are positioned within the handles on the side of the robot.

Due to the many benefits of vision systems for mobile robots, improvements to vision systems, and also illumination systems are always being sought for mobile robot applications.

SUMMARY OF THE DISCLOSURE

A first aspect of the present invention provides a vision system for a mobile robot, the vision system comprising: a lens module; an illumination system comprising a plurality of light sources; and a lens module holder. The lens module holder is positioned around the lens module and comprises a reflective surface for reflecting light emitted from the illumination system away from the lens module.

As a result, the lens holder acts to direct light from the illumination away from the lens module, and as such illumination provided by the illumination system is not able to directly enter the lens module, which could impair the vision system from working correctly.

The vision system may further comprise a vision system mount for mounting the vision system to a mobile robot, the vision system mount may comprise a plurality of holes through which the plurality of light sources protrude.

The vision system mount may comprise a heat sink to draw heat away from the plurality of light sources. This may help to extend the life of the light sources by reducing the risk of them overheating, and also stops the heat from the light sources from potentially damaging the lens module.

The plurality of light sources may be arranged in a ring around the lens module. This is a particularly space efficient arrangement which helps to reduce the size of the vision system.

The lens module may protrude above the lens module holder, and each of the plurality of light sources may be positioned below the reflective surface of the lens holder module. As a result, the lens module achieves the best possible field of view, unrestricted by the lens module holder, and the plurality of light sources are offered a level of protection from damage by the lens holder module.

The reflective surface may be a semi-parabolic toroid mirror.

A fin may be provided between each of the plurality of light sources. These fins may act to segment the light produced by the plurality of light sources, and thus make the light more directional. Each fin may be provided on the vision system mount of the earlier statement.

The vision system may further comprise a light-transmissive cover and the light-transmissive cover may cover the illumination system and define an aperture through which a top of the lens module protrudes. As a result, the light-transmissive cover protects the illumination system without obscuring or obstructing the illumination generated by it.

The lens module holder may protrude above an upper surface of a body of the mobile robot. As a result, the lens module achieves the best possible field of view, unrestricted by the body of the robot. In addition, the light reflected from the reflective surface can be emitted above the upper surface of the body of the robot.

Each of the plurality of light sources may be positioned below an upper surface of a body of the mobile robot. This affords a robust level of protection for the light sources against damage.

The lens module may comprise a plurality of lenses for focusing light onto an image sensor.

There may be eight light sources, and each light source may be independently controllable. Eight light sources allows for a high level of directional control over the illumination, but without being too complex to control.

A second aspect of the invention provides a mobile robot comprising the vision system of any one of the previous statements.

BRIEF DESCRIPTION OF THE FIGURES

In order that the present invention may be more readily understood, embodiments of the invention will now be described, by way of example, with reference to the following accompanying drawings, in which.

DETAILED DESCRIPTION OF THE DISCLOSURE

Figure 1:
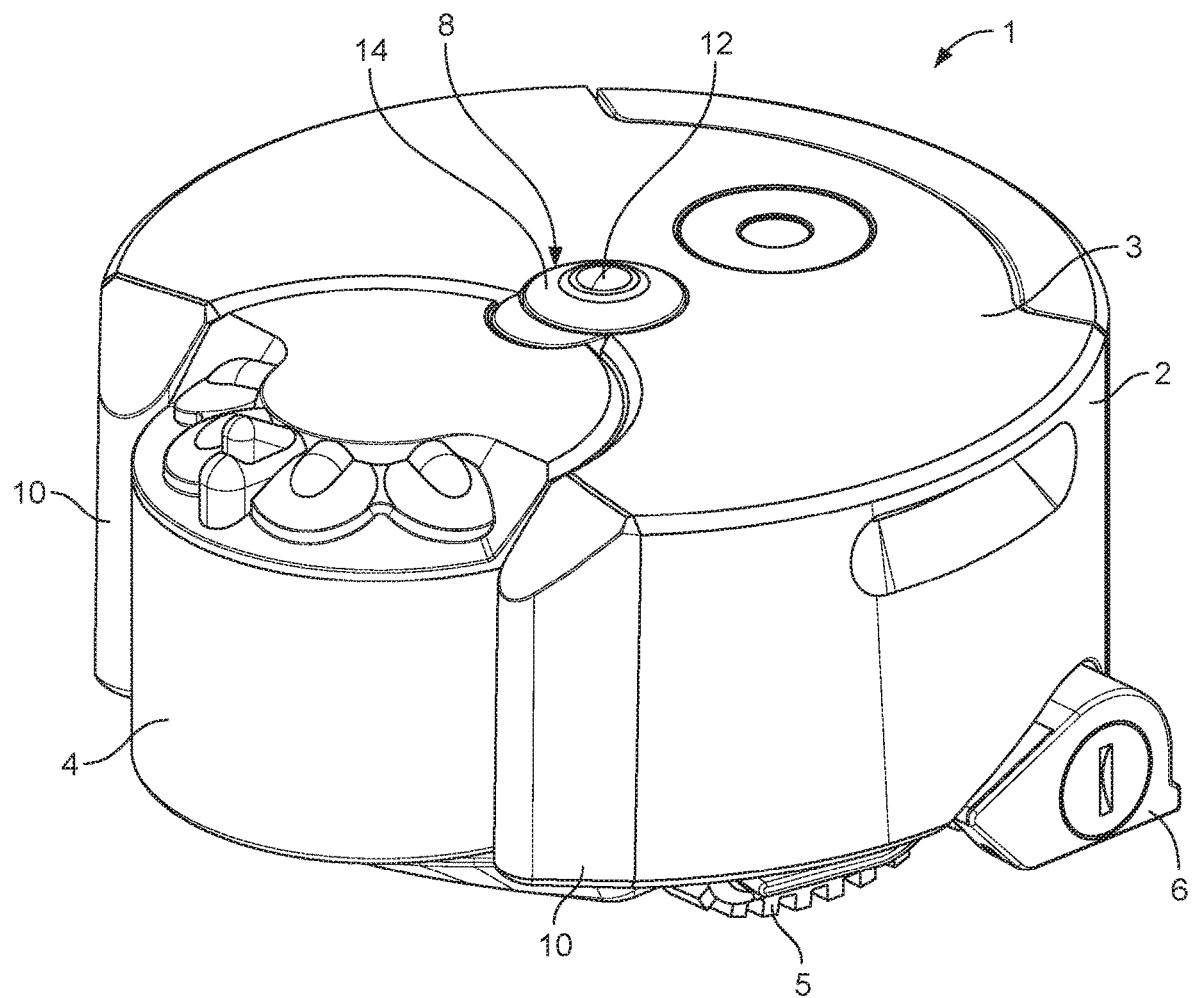
FIG. 1 shows a mobile robot.

FIG. 1 shows a robot vacuum cleaner 1 comprising a main body 2 and a separating apparatus 4. The main body 2 comprises traction units 5 in the form of continuous tank tracks, and also a cleaner head 6 which houses a brushbar, and through which dirty air can be drawn into the robot vacuum cleaner 1 and passed into the separating apparatus 4. Once the air has been cleaned of dirt in the separating apparatus 4, it passes out of the separating apparatus 21 and through the main body 2 which houses a motor and fan for generating the airflow. The air is then expelled from the robot 1 through an outlet vent. A vision system 8 protrudes from the top surface 3 of the main body 2 of the mobile robot 1. The vision system 8 comprises a camera 12 and an illumination system 14. The camera 12 is an omnidirectional camera, capable of capturing a 360° view of the environment surrounding the robot 1. The camera 12 may be, for example, a fisheye lens camera or a panoramic annular lens (PAL) camera.

The robot 1 comprises a control system, embodied within the software and electronics of the robot 1, which is able to use simultaneous localisation and mapping (SLAM) techniques to process the images captured by the vision system 8 and which allows the robot 1 to understand, interpret and autonomously navigate the local environment. The control system also uses information gathered from a number of other sensors provided on the robot 1, such as a bump sensor, and also comprises a number of position sensors such as position sensitive devices (PSDs) and/or time of flight (ToF) sensors. The PSDs and/or ToF sensors are housed within sensor pods 10 which flank the separating apparatus 4. The sensor pods are provided with transparent covers through which the PSDs and ToF sensors are able to emit and receive light such as infra-red (IR) light. The sensor pods 10 house an array of sensors that are directed in different directions such that obstacles can not only be detected in front of the robot, but also towards the sides. Downward facing sensors can also detect a drop in the floor surface, often referred to as cliff sensors, such that the robot is able to stop and/or adjust its direction of travel before it travels off a drop such as a staircase. Whilst some robots use moveable bumper portions as physical contact sensors, this robot 1 has a bump sensor which detects relative movement between separate chassis and body portions of the main body 2 to register physical contact with an obstacle.

Figure 2:
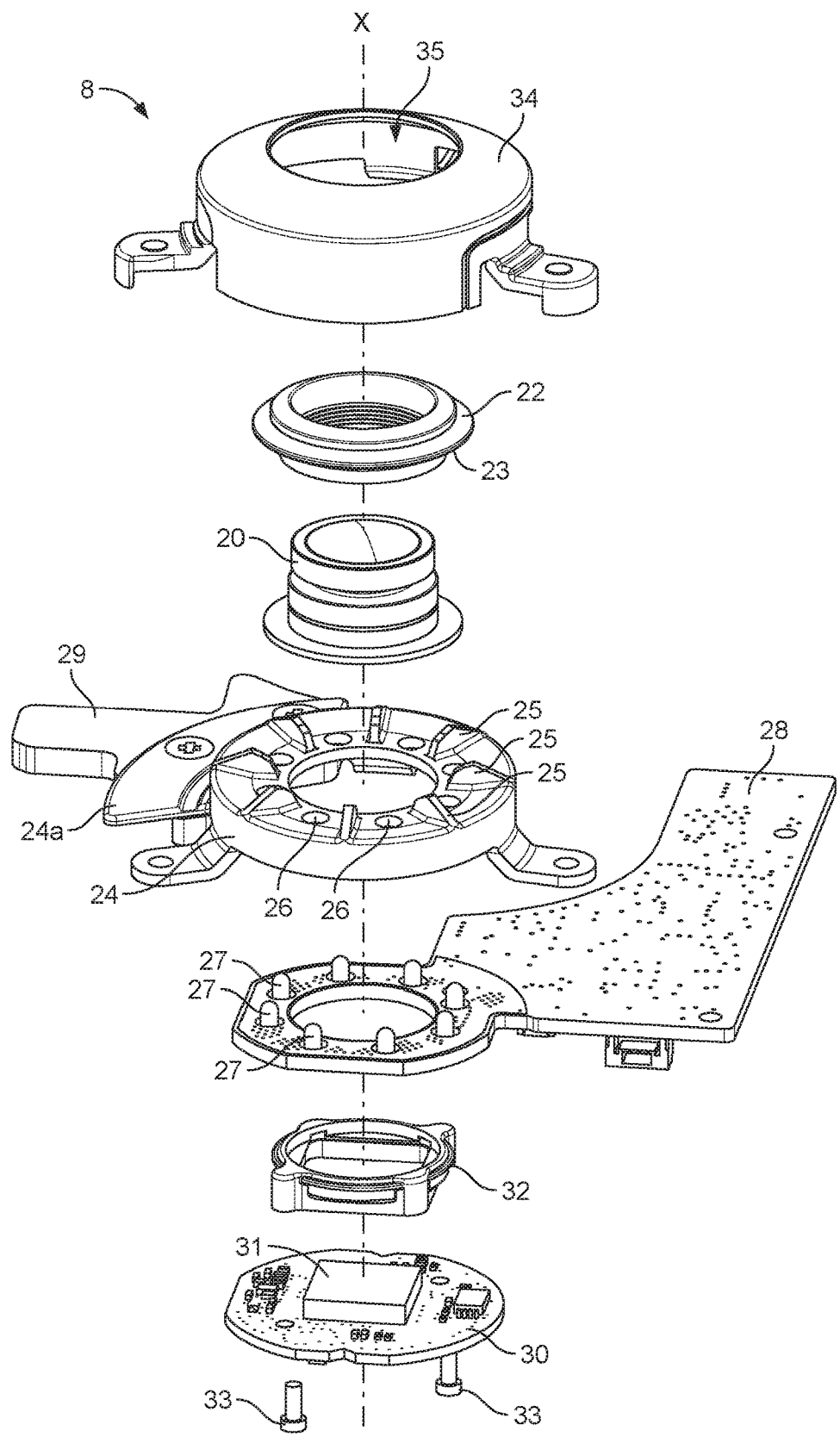
FIG. 2 shows an exploded view of the vision system of the mobile robot of FIG. 1.

FIG. 2 shows an exploded view of the vision system 8 of the mobile robot 1. The various parts of the vision system 8 have been separated from each other in an axial direction along the dotted axis marked X. The vision system 8 comprises a number of components which form both the camera 12 and the illumination system 14, including a lens module 20, a lens module holder 22, a vision system mount 24, a printed circuit board (PCB) 30 on which is provided an image sensor 31, a sensor mount 32, a second PCB 28 on which is provided a plurality of light sources in the form of light emitting diodes (LEDs) 27, and a light-transmissive cover 34. The lens module 20 is a fisheye lens module, and it is mounted to the image sensor 31 by way of the sensor mount 32. The sensor mount 32 is mounted to the PCB 30 over the image sensor 31 by way of screws 33. The sensor mount 32 is a mechanical component that is installed between the image sensor 31 and the lens module 20, with the purpose of aligning the lens module 20 and image sensor 31. The image sensor 31 can be one of any typically used in cameras, for example the image sensor 31 may be a charge-coupled device (CCD) sensor or a complementary metal oxide semiconductor (CMOS) sensor. An alternative embodiment of a sensor mount to sensor mount 32 is described later in relation to FIGS. 8, 9 and 10.

Eight LEDs 27 are arranged in a ring on PCB 28. The PCB 28 defines a hole through which the lens module 20 can extend such that the LEDs 27 are arranged in a ring around the lens module 20. Of course, it will be understood that the number of LEDs could differ, and the vision system may comprise two or more LEDs 27 depending on the illumination requirements of the vision system. The LEDs produce light in the visible part of the electromagnetic spectrum, but in alternative embodiments may produce light in other areas of the spectrum, for example infra-red or near infra-red light.

The vision system mount 24 is used to mount the assembled vision system 8 to the mobile robot 1. The vision system mount 24 comprises eight holes 26 through which the eight LEDs 27 can protrude. It will be understood that the number of holes 26 could also differ to match the number of LEDs 26. The vision system mount 24 further comprises a plurality of fins 25, positioned such that a fin 25 is positioned between each pair of neighbouring holes 26. These fins 25 act to segment the light produced by the LEDs 27, making the light more directional. The vision system mount 24 is formed of metal, such as magnesium, and acts as a heat sink to draw heat away from the LEDs 27. This helps to extend the life of the LEDs 27 by reducing the risk of them overheating, and also stops the heat from the LEDs 27 from damaging the lens module 20. To increase the efficacy of the vision system mount 24 as a heat sink, a heat sink 29 is fixed to the vision system mount 24 via the heat sink mount 24a.

The lens module holder 22 fits around the lens module 20, and acts to mount the lens module 20 to the vision system mount 24. A reflective surface 23 is provided on the underneath of a flange that projects radially outwards from the outside of the lens module holder 22. This reflective surface 23 forms a semi-parabolic toroid mirror which acts to reflect light emitted from the LEDs 27 outwards, which will be described in more detail below.

The light-transmissive cover 34 defines an aperture 35 through which the top of the lens module holder 22 and lens module 20 can protrude. The light-transmissive cover 34 therefore covers and protects the illumination system 14 part of the vision system 8, but leaves the camera 12 exposed to capture the highest quality images as possible.

Figure 3:
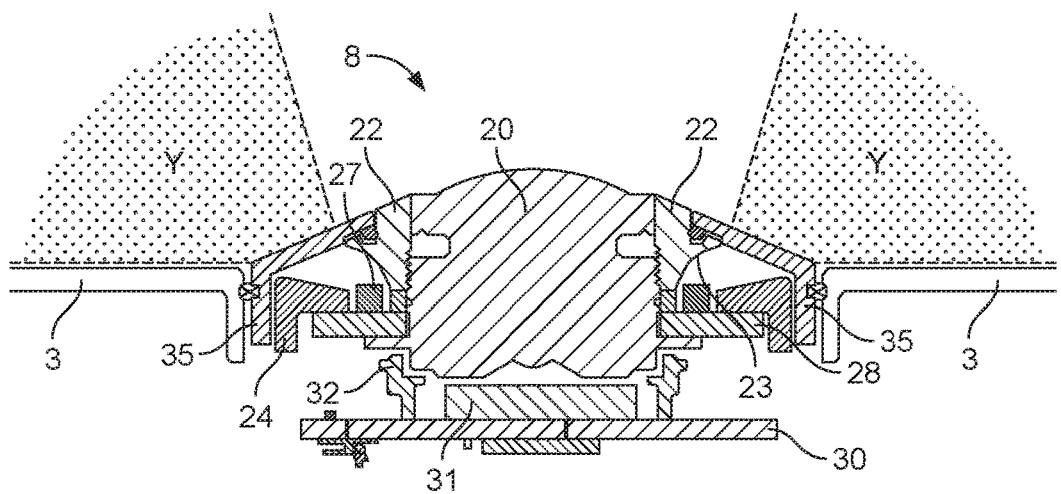
FIG. 3 shows a cross-section through part of the mobile robot of FIG. 1 including the vision system of FIG. 2.
Figure 4:
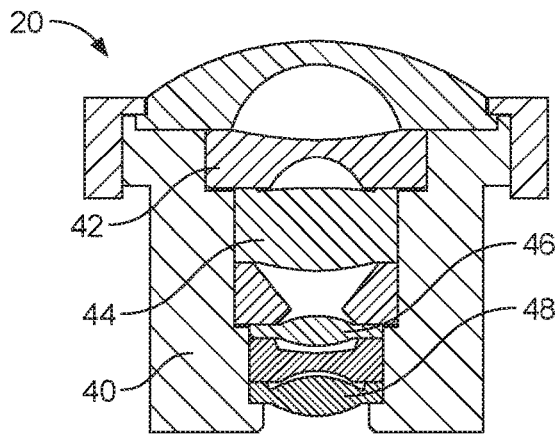
FIG. 4 shows a cross-section through a lens module for a vision system.

FIG. 3 shows a cross-section through the vision system 8 and a part of the mobile robot 1. The vision system 8 partially projects above the top surface 3 of the mobile robot 1. The image sensor 31 is positioned below the top surface 3 of the robot, and the lens module extends from the top surface of the image sensor 31 to the very top of the vision system 8. A cross-section through an example of a fisheye lens module is shown in FIG. 4. A plurality of lenses 42, 44, 46, 48 are held within a lens module body 40. It can be seen in FIG. 3 that the LEDs 27 are positioned below the top surface 3 of the mobile robot, this helps to protect the LEDs and the PCB from being damaged. However, the light emitted from the LEDs 27 is directed upwards and outwards through the light-transmissive cover 35 to illuminate the environment around the mobile robot, as indicated by the areas marked Y.

Figure 5:
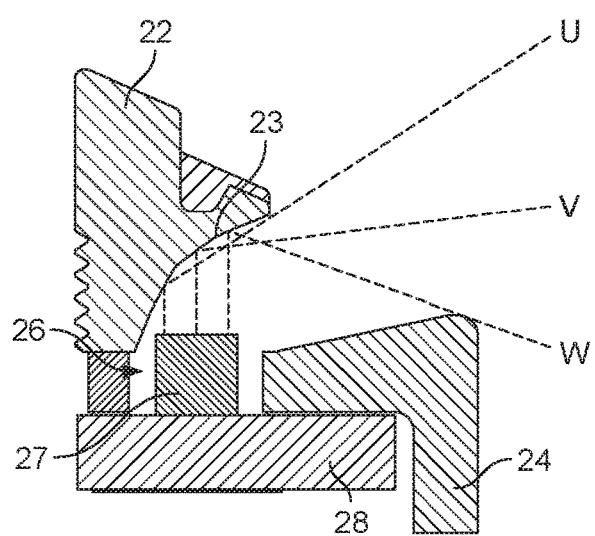
FIG. 5 shows a cross-section through part of the vision system of FIGS. 2 and 3.

FIG. 5 shows how the reflective surface 23 on the lens module holder 22 is a semi-toroidal parabolic mirror which acts to direct the light from the LED 27 in a direction away from the lens module. As a result, light from the LEDs 27 is not able to travel directly into the lens module which would act to effectively blind the vision system with excessive brightness. The reflective surface 23 is provided on the underneath of a flange that projects radially outwards from the outside of the lens module holder 22, and the flange extends radially outwards beyond the LED 27 such that no light from the LED 27 is able to travel straight upwards. If light from the LED 27 was able to travel directly upwards, this would cause a bright spot where the illumination was concentrated on the ceiling above the mobile robot, which again would act to effectively blind the vision system with excessive brightness. Instead, example illumination rays U V and W show how the reflective surface 23 reflects the light radially outwards into the environment around the mobile robot 1.

What is more, as the reflective surface 23 extends slightly above the top surface 3 of the mobile robot, as shown in FIG. 3, light from the LED 27 is able to extend in a horizontal direction parallel with the top surface 3 of the robot 1. As a result, the illumination system is even able to illuminate areas to the sides of the mobile robot.

Figure 6:
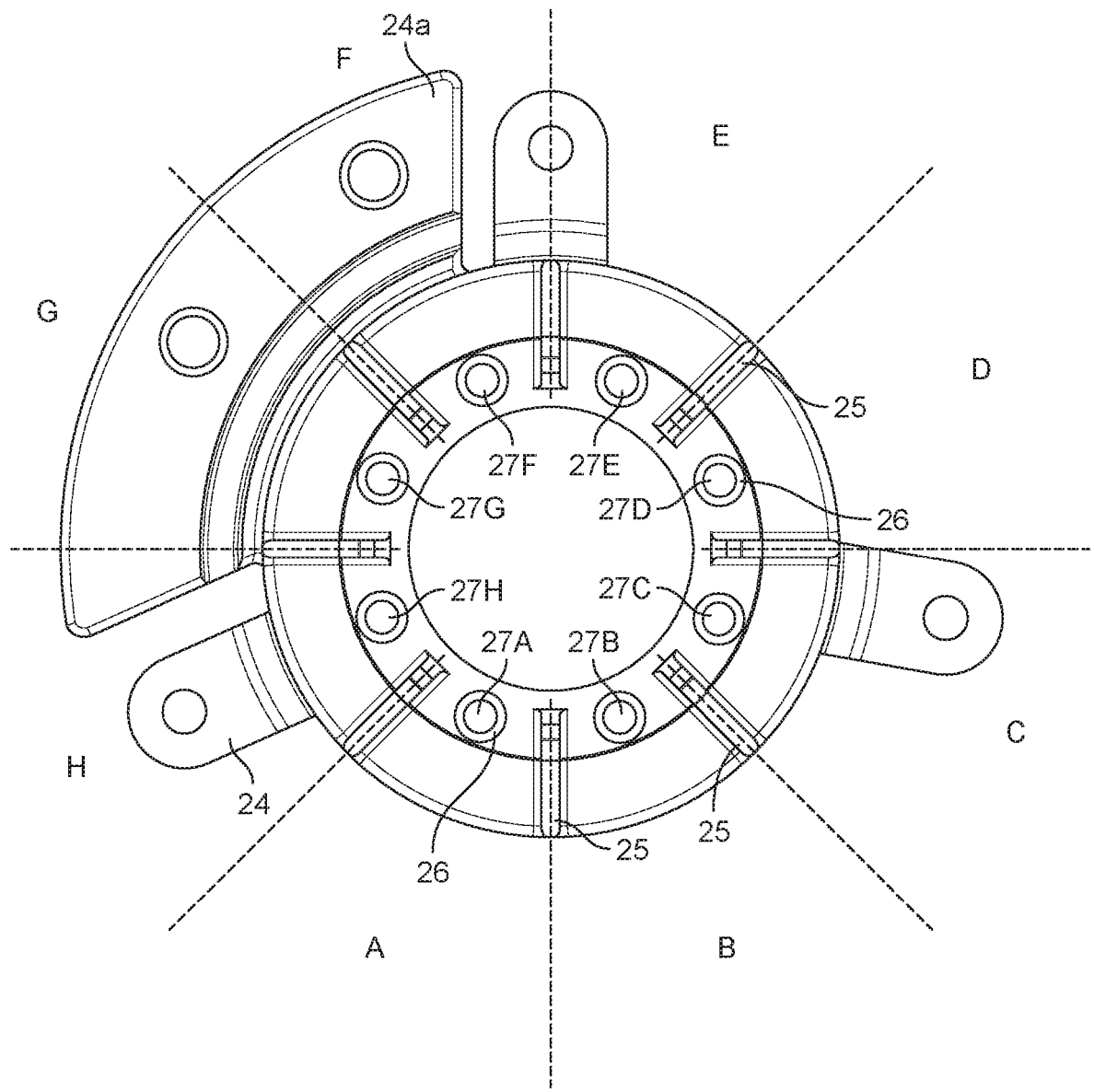
FIG. 6 shows the vision system mount from the vision system of FIGS. 2 and 3.

FIG. 6 shows a top view of the vision system mount 24, and the LEDs 27 projecting through each of the holes 26. Each of the LEDs produce light which acts to illuminate a particular illumination area A-H. For instance, LED 27A illuminates illumination area A, LED 27B illuminates the illumination area labelled B, and so on. This segmentation effect is emphasised by the fins 25. The tops of the fins 25 are shaped such that when the vision system 8 is assembled, the tops of the fins follow the curved shaped of the reflective surface, and so this reduces any light leakage from any particular LED outside of its illumination area. Each of the LEDs 27A-H is individually controllable, and so illumination can be provided in the parts of an environment only where necessary. This helps to minimise any wasted power, and therefore extends the battery life of the product. Extending the battery life allows the mobile robot to have more run time, and to cover more floor area before needing to go back to a charging station to recharge. The illumination areas A-H together amount to a complete illuminable area that extends a full 360° around the mobile robot 1.

In some embodiments, the LEDs may be grouped together to simplify the control. For example, LEDs 27A and 27B may be a first group, 27C and 27D a second group, 27E and 27F a third group and then 27G and 27H a fourth group. These groups then may be independently controllable. This provides the robot with quadrant illumination control as opposed to octant illumination control where all eight LEDs 27 are individually controllable. It will be appreciated that other groupings and numbers of LED groups may be chosen depending on the requirements of the vision system and the mobile robot.

Figure 7A:
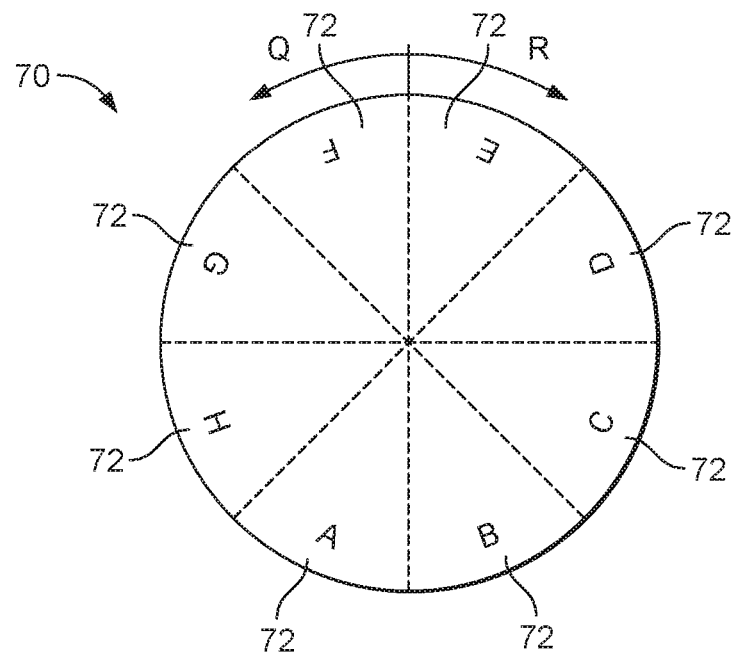
FIG. 7A is a representation of a spherical image captured by the vision system of FIGS. 2 and 3, and 7B is a representation of the image of FIG. 7A after being unwrapped.

FIG. 7A shows a representation of a spherical image 70 captured by the vision system 8. The image 70 can be segmented into a number of segments 72 which correspond to the LED illumination areas A-H. During processing, the spherical image 70 is split and unwrapped as indicated by arrows Q and R, and an unwarped rectangular image 74 showing a full 360° view around the mobile robot 1 is achieved. The segments 72 in the spherical image 70 then correspond to segments 76 in the rectangular image 74. While the robot 1 is operation, the illumination system 14 can be used to brighten any of the areas of the environment captured by the camera, corresponding to the segments labelled A-H. For example, if an area ahead of the robot is dark, such as when the robot is travelling from a well-lit room into a darkened room, then the forward-facing segments A and B will appear darker in the images 70 and 74. The robot's control system can therefore increase the power to the LEDs 27A and 27B such that they provide more illumination in the A and B segments, and the robot is able to continue. More detail on the control of the illumination system will be described below in relation to FIGS. 11 to 14.

Figure 8:
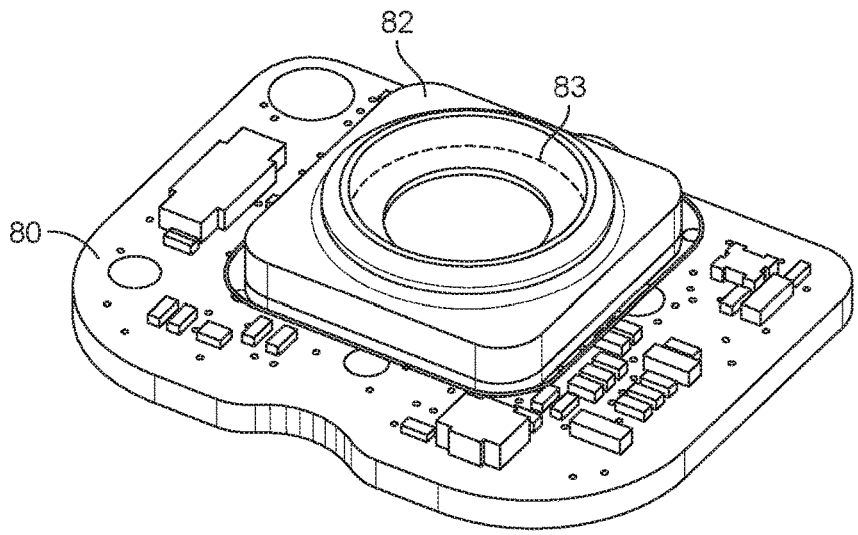
FIG. 8 shows a sensor mount on a PCB.

FIG. 8 shows an alternative embodiment of a sensor mount 82 which is mounted to an image sensor on a PCB 80. The sensor mount 32 described earlier in relation to FIG. 2 was mounted to the image sensor 31 and PCB 30 by way of screws 33. The screws help to maintain the image sensor 31 and sensor mount 32, and therefore the lens module, in good alignment. However, in the alternative embodiment of FIG. 8, no screws are used to mount the sensor mount 82 to the image sensor. As such, the alternative embodiment sensor mount 82 can be referred to as a passive alignment sensor mount 82. The passive alignment sensor mount 82 is provided with an engaging portion 83 which can engage with a lens or lens module. The engaging portion 83 in this embodiment is provided with a screw thread that compliments a similar screw thread on the lens or lens module such that the lens or lens module can be screwed onto the passive alignment sensor mount 82.

The passive alignment sensor mount 82 is a mechanical component that is installed between an image sensor and a lens or lens module. As with the earlier described sensor mount 32, the purpose of the passive alignment sensor mount 82 is to align the lens or lens module and the image sensor, however in this instance the passive alignment sensor mount 82 must create a centred, focused image on the image sensor just by mechanical means and with no external input for example by way of screws. The sensor mount 82 must also allow the relative movement needed for focusing.

Figure 9:
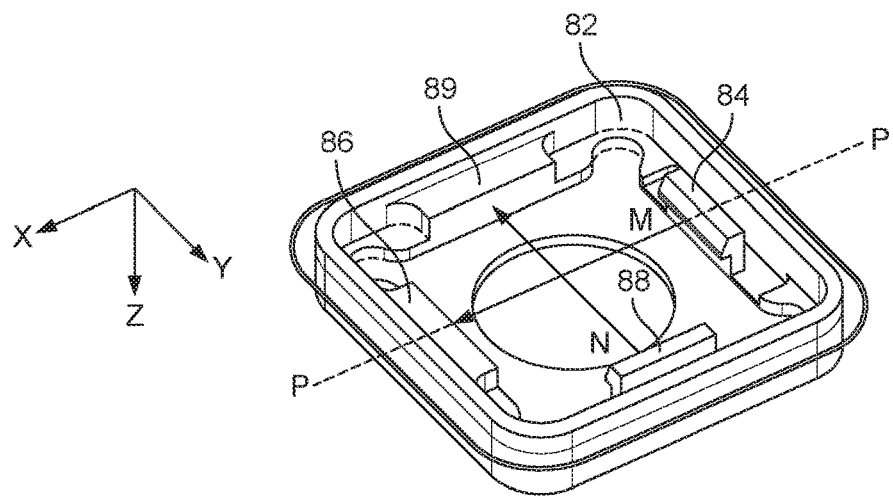
FIG. 9 shows an underneath view of the sensor mount of FIG. 8.
Figure 10:
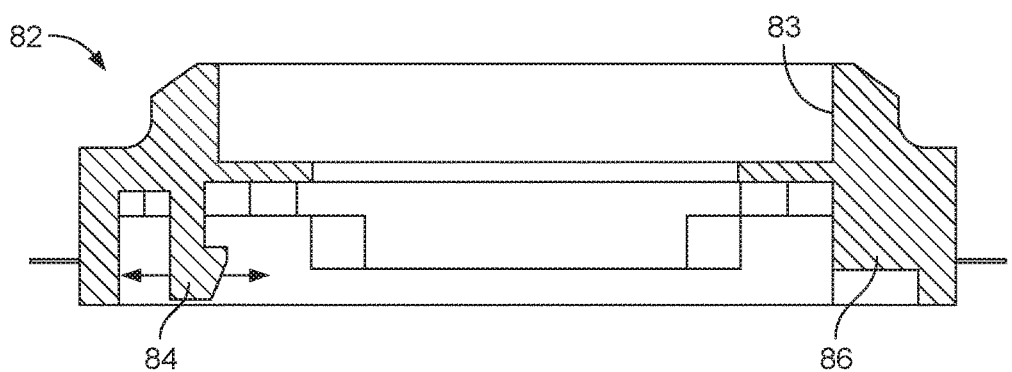
FIG. 10 shows a cross-section through the sensor mount of FIG. 9.

FIG. 9 shows an underneath view of the passive alignment sensor mount 82, and FIG. 10 shows a cross-section through the passive alignment sensor mount through the line P-P indicated in FIG. 9. The x-axis alignment is achieved thanks to a first deformable plastic element 84 which acts on a lateral face of an image sensor. This creates a force represented by the arrow M which presses the image sensor against a first perpendicular datum 86 which is integrated in the body of the passive alignment sensor mount 82. Similarly, the y-axis alignment is achieved thanks to a second deformable plastic element 88 which acts on another lateral face of the image sensor. This creates a force represented by the arrow N which presses the image sensor against a second perpendicular datum 89 which is also integrated in the body of the passive alignment sensor mount 82. By pressing the image sensor against the two perpendicular datums 86, 89, this aligns the sensor axes to the axes of the passive sensor alignment mount 82.

Regarding the Z axis, the passive alignment sensor mount 82 sits on top of the image sensor package glass, which forms the top layer of the image sensor, using it as the third datum and allowing an alignment of the optical axis of the lens and the normal vector of the glass, which correspond to the "pitch" and "yaw" axes of the lens. The "roll" axis is left free to rotate for focusing purposes. This set of reactions create an alignment with tolerances minimised down to the manufacturing tolerances of the lens, sensor mount and image sensor package.

As previously described, the passive alignment sensor mount 82 allows the alignment of a lens and an image sensor in both x and y axes, and also in Pitch and Roll, by only passive mechanical means. An additional benefit of the passive alignment sensor mount 82 is that, due to the elastic nature of the first and second deformable plastic elements, the passive alignment sensor mount is attachable and detachable to an image sensor without causing any damage to the any of the components.

Figure 11:
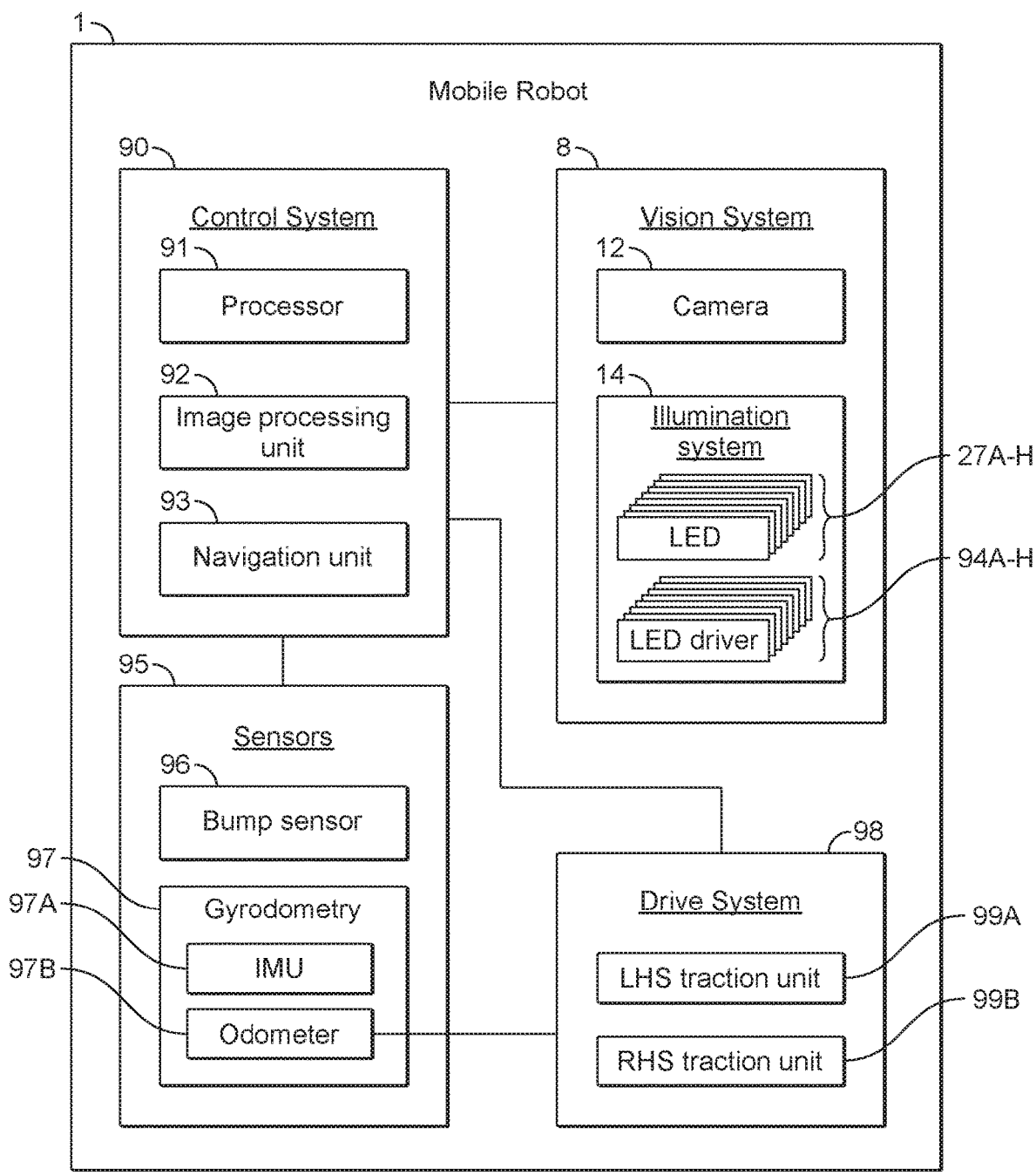
FIG. 11 shows a schematic representation of a mobile robot.

FIG. 11 shows a schematic representation of an embodiment of the mobile robot 1. The illumination control algorithm is carried out in a control system 90 of the mobile robot 1. The control system 90 comprises a processor 91, an image processing unit 92 and a navigation unit 93. The control system may comprise other units not shown in FIG. 11 for the control of other systems of the mobile robot 1, for example the control system may further comprise a task control unit to control a task being carried out by the mobile robot, such as a vacuum cleaning operation.

The vision system 8 comprises a camera 12 and an illumination system 14. As has already been described, the camera 12 is capable of capturing images of an area surrounding the mobile robot 1. For example, the camera 12 may be an upwardly directed camera to capture images of the ceiling, a forward-facing camera to capture images in a forward travelling direction of the robot 1, a panoramic annular lens (PAL) camera that captures a 360° view of the area surrounding the robot 1, or a fisheye lens camera which also is able to capture a 360° view of the area surrounding the robot 1.

The illumination system 14 is able to improve the quality of the images captured by the camera 12 when the robot 1 is located in an environment that has low-light conditions, or where the images captured by the camera 12 suffer from poor contrast. The illumination system 14 is shown comprising a number of LEDs 27A-H corresponding to the LEDs shown in previous figures. Each one of the LEDs 27A-H has a corresponding LED driver 94A-H which is used to drive power to the LED. The LEDs 27A-H emit light of any bandwidth that the camera's sensor is able to detect in order to improve the quality of the images captured by the camera 12. For example, the light emitted by the LEDs may be within the visible, near infrared (NIR) or infrared (IR) parts of the electromagnetic spectrum. Visible light has been found to be particularly beneficial, particularly as the robot owner is able to more easily determine that the illumination system is functioning correctly and effectively.

The control system 90 is also responsible for controlling movement of the mobile robot 1 within its environment. Images and other data gathered by the vision system 8 are fed into the navigation unit 93 of the control system 8. The navigation unit 93 may be, for example, a simultaneous localisation and mapping (SLAM) unit. A SLAM unit can be used to analyse the images to find landmark features within the area surrounding the robot 1 shown in the images. Landmark features are high-contrast features that are easily detected within the image, for example the edge of a table, or the corner of a picture frame. Part or all of the analysis of the images may be performed by the image processing unit 92. The landmark features can then be used by the navigation unit 93 to triangulate and determine the position or pose of the robot within the environment. The navigation unit 93 can use the information from the images and data captured from other sensors in the mobile robot 1 to create a map of the environment which the robot 1 uses to interpret and navigate the environment.

Instructions are sent from the control system 8 to the drive system 98 which causes the robot 1 to move. The drive system 98 is shown in FIG. 1 as comprising a left hand side (LHS) traction unit 99A and a right hand side (RHS) traction unit 99B. Each traction unit 99A, 99B can be independently controlled such that the robot 1 can be steered. For example, if the RHS traction unit 99B is driven in a forward direction faster than the LHS traction unit 99A, then the robot will veer to the left as it moves forward, or as a further example if the LHS and RHS traction units 99A, 99B are each driven at the same speed but in opposite directions then the robot 1 will turn on the spot.

The mobile robot 1 also comprises a system of sensors 95 that provide the robot 1 with information about the surrounding environment, and the robot's pose within the environment. The sensors system 95 includes a bump sensor 96 and a gyrodometry system 97. The gyrodometry system 97 includes an inertial measurement unit (IMU) 97A and an odometer 97B. The odometer 97B receives data from the drive system 98 to provide an indication of the distance travelled by a traction unit (e.g. by using the number of revolutions of a wheel). The bump sensor 96 lets the robot 1 know when physical contact has been made with an obstacle. In response to a signal from the bump sensor 96, the robot can for example stop and/or adjust its position and trajectory. This prevents the robot 1 from causing any damage to itself or to the obstacle with which it has made contact. The sensor system 95 may comprise other sensors which are not shown in FIG. 11, for example one or more proximity sensors such as PSDs and/or ToF sensors. Proximity sensors are able to give an indication of any obstacles that may be near the robot 1. This allows the robot 1 to avoid obstacles without making contact with them.

Details on how the illumination system is controlled will now be described.

Figure 12:
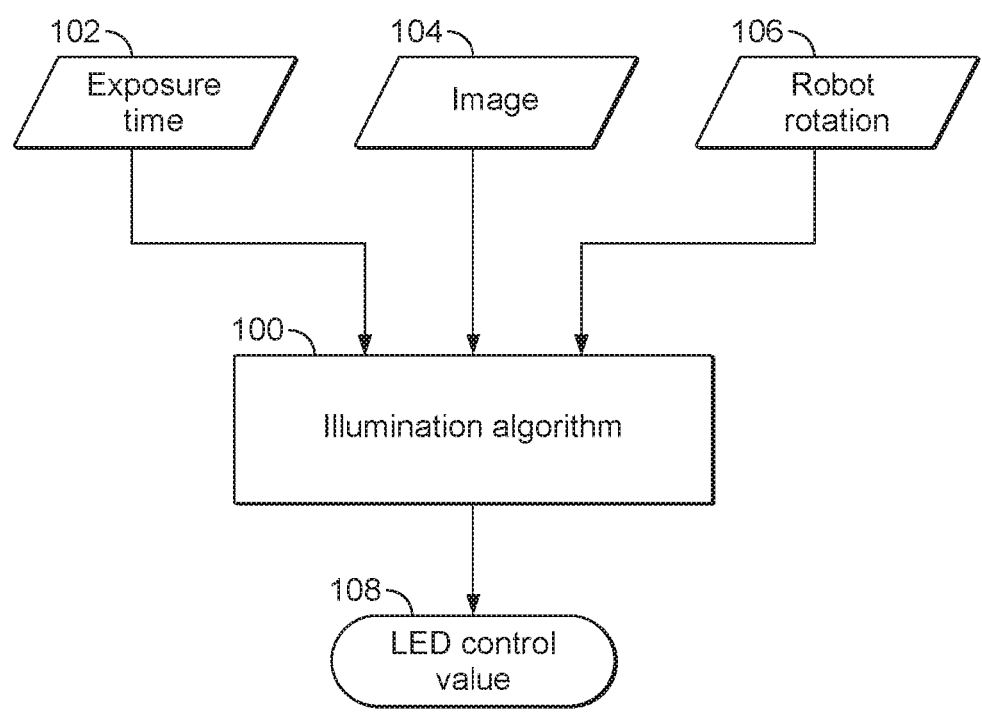
FIG. 12 is a flow diagram showing the inputs and outputs of an illumination algorithm for a mobile robot.

FIG. 12 is a flow diagram showing the inputs and outputs of an algorithm 100 used for controlling the illumination system 14 on the mobile robot 1. The illumination algorithm has three inputs that it uses to provide an LED control value 108: exposure time 102, an image 104 from the camera 12, and information about the robot's rotation 106. FIG. 12 shows a single LED control value 108 as the output of the illumination algorithm 100, however it will be appreciated that more than one LED control value 108 may be generated if the control of multiple LEDs requires it.

The illumination algorithm 100 controls the illumination system 14 to provide balanced light which enables the navigation unit 93 to perform reliably in dark areas. The algorithm 100 analyses every single frame captured by the camera 12 and assesses the need to employ enhanced illumination from the illumination system 14. The frequency of algorithm execution is same as the frequency at which frames are captured by the camera 12.

The exposure time 102 is calculated and passed to illumination algorithm. The Illumination system will be activated only when the calculated exposure time 102 exceeds a certain threshold. This means that under normal lighting conditions the illumination system will typically remain off to prevent unnecessary wasting of power which would reduce the run time of the robot. The exposure time 102 is calculated by an exposure control algorithm, the details of which fall outside the scope of the present invention. However, it will be understood that there are a number of well-known ways in which exposure time can be calculated, such as metering algorithms used to calculate exposure values, and it is not necessary for the purpose of this document to detail the exact method adopted.

If the robot 1 rotates, then information about the robot's rotation 106 is used by the algorithm 100 to shift the light. This information is obtained from the gyrodometry system 97. Without using information on the robot's rotation, the algorithm would be able to adjust the illumination accordingly, but it would take time for the algorithm to assess the new image frames and to make the necessary adjustments. During this adjustment time the image would suffer from saturated or very dark pixels, and would negatively impact the navigation of the robot. However, by using information on the rotation of the robot, the algorithm is able to shift the light in the opposite direction to the robot's rotation to maintain the illumination in the necessary areas of the environment around the robot 1 far quicker.

Figure 13:
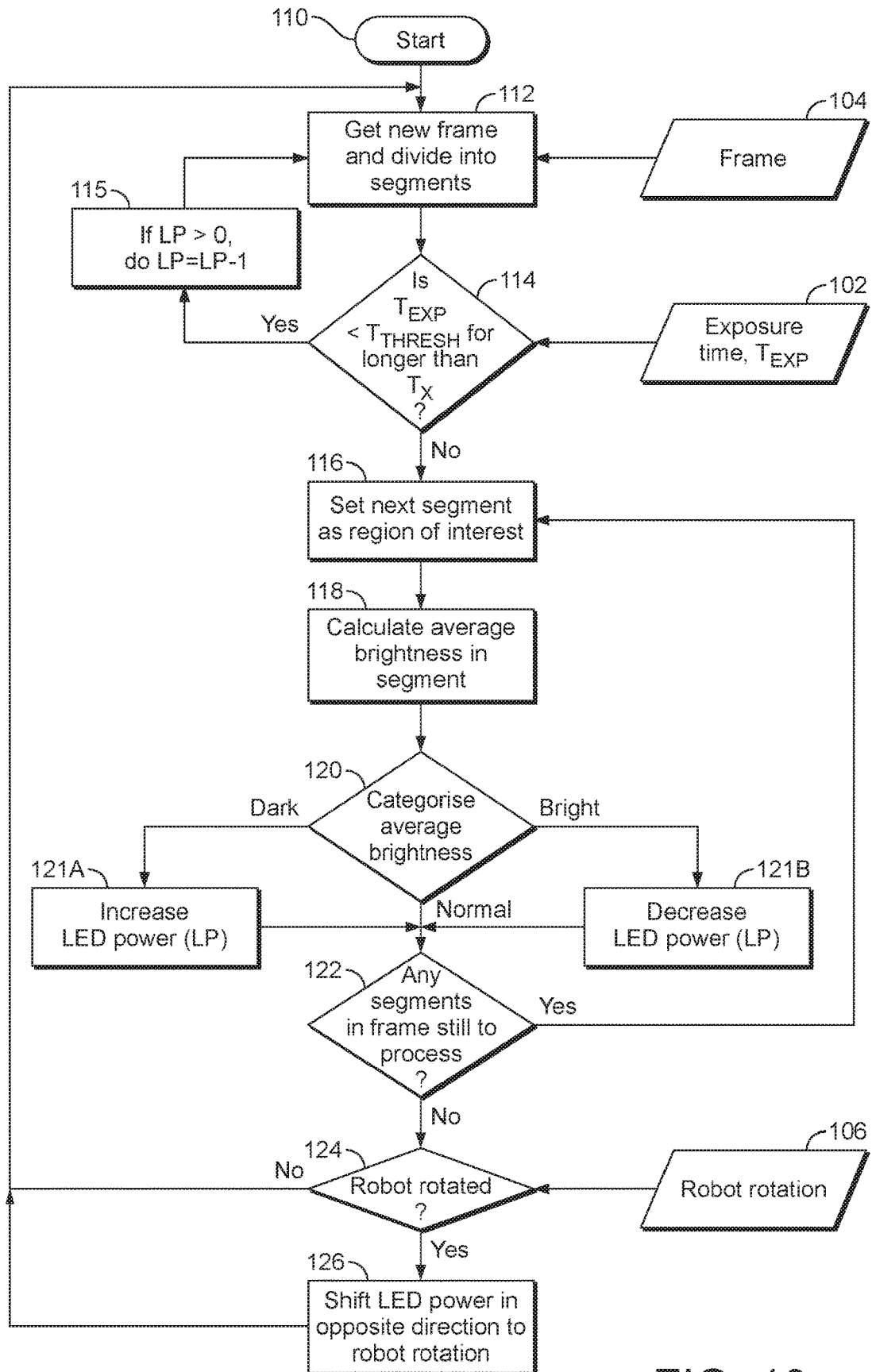
FIG. 13 is a flow diagram showing steps in the illumination algorithm of FIG. 12.

FIG. 13 is a flow diagram showing the steps taken during execution of the algorithm 100. The algorithm starts at 110, and the first action at 112 is to obtain a new frame 102 from the camera 12 and to divide it into segments. The frame 102 will be the unraveled rectangular image such as that shown in FIG. 7B, which was unraveled by the image processing unit 92. The segments correspond to the segments and illumination areas A-H previously discussed in relation to FIGS. 6, 7A and 7B.

In step 114, if the calculated exposure time, $T_{EXP}$ 102, is less than a threshold exposure time $T_{THRESH}$ for longer than a predetermined time period $T_X$, then it is determined that the illumination system is unnecessary, and the LED power, LP, is reduced in step 115. This reduction in LP will result in the LEDs dimming to zero over time as each frame is analysed while $T_{EXP}$ remains less than $T_{THRESH}$. This has been chosen to give the change to the illumination a smooth and gradual effect. However, an alternative would be to turn the power off to the LEDs immediately.

If the calculated exposure time, $T_{EXP}$ 102, is not less than a threshold exposure time $T_{THRESH}$ for longer than a predetermined time period $T_X$, (i.e. it is greater than the threshold) then it is determined that the illumination system is necessary, and the algorithm continues to step 116 in which the next segment A-H is selected as the region of interest for the next steps.

A threshold exposure time, $T_{THRESH}$, of 150 milliseconds (0.15 seconds), and a predetermined time period $T_X$ of 3 seconds have been found to provide an optimum balance. However, a $T_{THRESH}$ in the range of 50 to 300 milliseconds (0.05 to 0.3 seconds) may be selected, and $T_X$ in the range of 1 to 5 seconds may be selected. Other values for $T_{THRESH}$ and $T_X$ outside of these ranges may be selected if the requirements of the robot necessitate them.

The average brightness for the selected segment is then calculated in step 118. The average brightness is calculated using the mean average of pixel intensity in the segment.

The average intensity, or brightness, for each segment is calculated using equation 1 below, where sw is segment width and sh is segment height. For example, in a 1024×128 image with eight segments, sw=128 and sh=128, or in a different embodiment a 1024×128 image with four segments, sw=256 and sh=128. This equation calculates the sum of intensity for all pixels and then divides it by the total number of pixels in the segment.

$$\text{average intensity} = \frac{\sum_{i=1}^{sw} \sum_{j=1}^{sh} im(i,j)}{sw \times sh} \quad \text{(Equation 1)}$$

The average intensity calculated in equation 1 is then categorised as an average brightness using equation 2 below. Two predetermined parameters a and b are used to determine the brightness of the image. If the average intensity for a segment is between a and b then the brightness of that segment is considered as normal. If the average intensity for a segment is above b, that segment is considered bright. Finally, if the average intensity for a segment is less than a, that segment is considered dark.

$$\text{brightness} = \begin{cases} \text{average intensity} > a, & \text{brightness = bright} \\ b < \text{average intensity} < a, & \text{brightness = normal} \\ \text{average intensity} < b, & \text{brightness = dark} \end{cases} \quad \text{(Equation 2)}$$

In step 120, if the categorised average brightness for the selected segment is "normal", then the algorithm proceeds straight to step 122 where a check is carried out to determine if there are any segments left in the frame to process. If there are still segments remaining, then the algorithm returns to step 116 and selects the next segment in the frame as the region of interest and repeats the brightness calculation and categorisation steps.

Alternatively, if in step 120 the categorised average brightness for the selected segment is "dark", then the algorithm proceeds instead to step 121A in which the LED power, LP, to the LED responsible for illuminating that segment is increased. This is carried out by sending an increased LP value to the LED Driver 94 for that LED 27. The algorithm then proceeds to step 122 as previously described.

Alternatively, if in step 120 the categorised average brightness for the selected segment is "bright", then the algorithm proceeds instead to step 121B in which the LED power, LP, to the LED responsible for illuminating that segment is decreased. This is carried out by sending a decreased LP value to the LED Driver 94 for that LED 27. The algorithm then proceeds to step 122 as previously described.

Once all the segments in a frame have been processed, at step 122 the algorithm then proceeds to step 124 which determines whether the robot 1 has rotated using robot rotation information 106 obtained from the gyrodometry system 97. If the robot has not rotated, then the algorithm returns to step 112, obtains a new frame 104 from the camera and repeats the process. However, if the robot has rotated, then the algorithm proceeds to step 126 and shifts the LED power (LP) values in the opposite direction to the robot rotation by the appropriate number of segments for the detected angle of rotation of the robot. For instance, if there are eight LED segments, the algorithm shifts the associated LP values by 1 segment per 45° rotation opposite to the direction of rotation. Alternatively, if there are four LED segments, then the algorithm shifts the associated LP values by 1 segment per 90° rotation opposite to the direction of rotation.

Figure 7B:
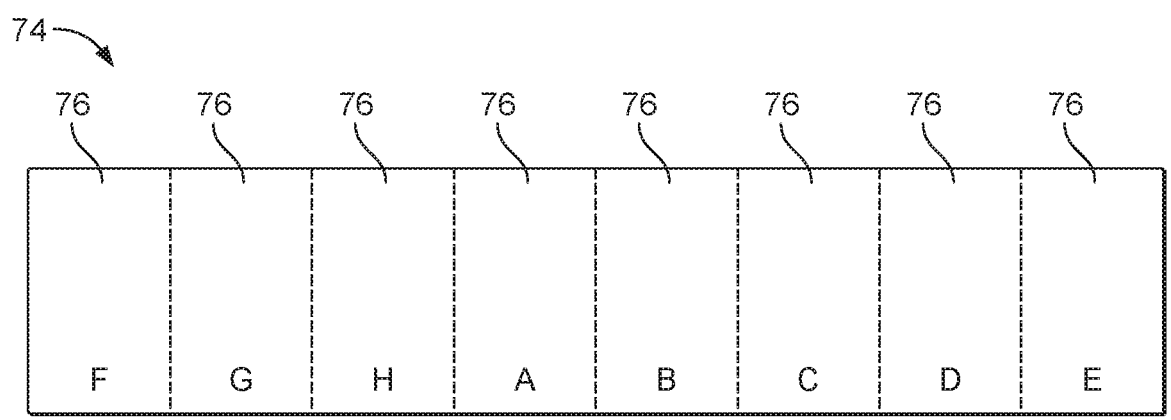

For example, taking the image segments shown in FIGS. 7A and 7B and the corresponding LEDs 27A-H from FIG. 6, the first row of Table 1 below shows LP values for each of the LEDs A-H in a first robot pose. In this pose there is a dark area ahead of the robot 1, and so the LEDs 27A and 27B that are directed towards the front of the robot 1 are illuminated considerably, and the LEDs 27H and 27C which are directed toward the right and left peripheries of the front of the robot are illuminated slightly. The second row of Table 1 then shows LP values for each of the LEDs A-H in a second robot pose, where the robot has turned 90° in a clockwise direction and all other factors have remained the same. After the 90° clockwise rotation, LEDs 27C and 27D which are directed towards the left hand side of the robot are now facing the dark area, and so are illuminated due to the algorithm shifting the LP values anti-clockwise by two segments.

TABLE 1

| LED | 27A | 27B | 27C | 27D | 27E | 27F | 27G | 27H |
|---|---|---|---|---|---|---|---|---|
| Pose 1 | 0.3 | 0.3 | 0.1 | 0 | 0 | 0 | 0 | 0.1 |
| Pose 2 | 0 | 0.1 | 0.3 | 0.3 | 0.1 | 0 | 0 | 0 |

Of course, if the robot is rotating slowly enough, the algorithm does not need to shift the light, as the illumination will be sufficiently adjusted by the brightness calculation. As such, rotation may only be considered if the speed of the rotation is quicker than a predetermined threshold.

Once the LP values have been shifted by the algorithm by the required amount in step 126, the algorithm returns to step 112, obtains a new frame 104 from the camera and repeats the process.

An algorithm using the steps set out in the flow diagram in FIG. 13 could result in some slight "oscillation" of the light generated by the illumination system. Oscillation can occur when the illumination produced by the illumination system changes rapidly. For example on entering a dark area from a light environment, a rapid increase in illumination may result in the image appearing too bright. To counteract this, the algorithm will decrease the illumination, which in turn will cause the image appearing too dark and so on. In order to prevent this oscillation effect, there should be a slight delay before the level of illumination is changed to make sure that the detected change in ambient light is persistent and continues. In addition, illumination transitions should be slowed slightly and smoothened. However, it is necessary that the robot reacts to changes in ambient light quick enough that its navigation system is able to continue unhindered.

Figure 14:
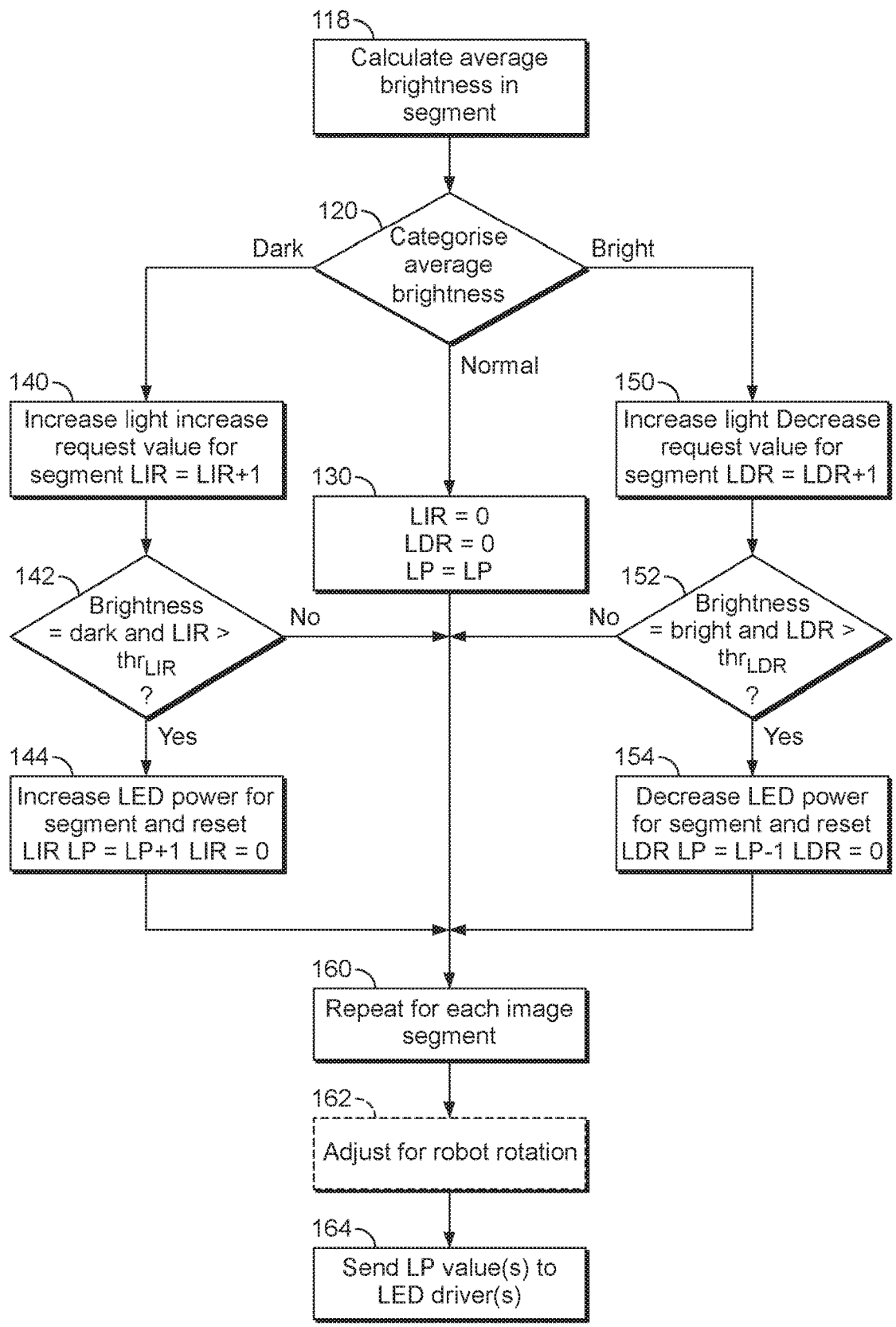
FIG. 14 is a flow diagram showing alternative steps in part of the illumination algorithm of FIG. 13.

FIG. 14 is a flow diagram showing alternative steps in part of the illumination algorithm of FIG. 13 which address the issue of oscillation. Steps 118 and 120 are the same as in FIG. 13, but the subsequent steps differ. A Light increase request (LIR) and a light decrease request (LDR) are introduced into this method.

In the case where the average brightness is categorised as "normal" in step 120, the algorithm proceeds to step 130 where the values of the LIR and the LDR are reset to zero, and the LED power (LP) remains unchanged. The algorithm then repeats for each image segment in the same way as the algorithm shown in FIG. 13. This has been represented in FIG. 14 as step 160 to simplify the diagram.

In the case where the average brightness is categorised as "dark" in step 120, the algorithm proceeds to step 140, where the LIR value for the current selected segment is increased. In this example, the LIR value is increased by 1. Then, in step 142 if the condition is met that the brightness is "dark" and the current LIR value is above a predetermined threshold $thr_{LIR}$, then the LED power LP for the segment is increased (LP=LP+1) and the LIR value is reset to zero (LIR=0). The algorithm then repeats for each image segment in step 160.

In the case where the average brightness is categorised as "bright" in step 120, the algorithm proceeds to step 150, where the LDR value for the current selected segment is increased. In this example, the LDR value is increased by 1. Then, in step 152 if the condition is met that the brightness is "bright" and the current LDR value is above a predetermined threshold $thr_{LDR}$, then the LED power LP for the segment is decreased (LP=LP-1) and the LDR value is reset to zero (LIR=0). The algorithm then repeats for each image segment in step 160.

Once all the segments for the current frame or image have been processed, then the algorithm proceeds to step 162 where it adjusts the LP values for any rotation of the robot in the same way as described in relation to steps 124 and 126 in FIG. 13. Once the LP values have been adjusted for robot rotation, the algorithm then proceeds to step 164 where all the LP values are sent to each respective LED driver. The algorithm then returns once again to step 112 of the algorithm and fetches a new frame.

Therefore, in summary, equation 3 below shows how the brightness in the image will be interpreted. If the image is dark then LIR will be incremented. If the brightness is normal, both light requests LIR and LDR will be reset. If the brightness is bright, then LDR will be incremented.

$$LED\ LI/LD\ \text{request} = \begin{cases} \text{brightness} = \text{dark}, & LIR = LIR+1 \\ \text{brightness} = \text{normal}, & LIR = 0, LDR = 0 \\ \text{brightness} = \text{bright}, & LDR = LDR+1 \end{cases}$$

(Equation 3)

By having the light change requests the transition between changes in light levels will be smooth. In addition, the need for the LIR and LDR values to exceed a threshold before a change in illumination occurs creates a delay in applying the changes. By using this method in the algorithm, the light will not oscillate.

A further benefit of this method is that the rate of speed of change of the illumination can be easily adjusted by changing the thresholds for the number of increase/decrease requests, $thr_{LIR}$ and $thr_{LDR}$. Higher thresholds will decrease the rate of speed of change, whereas lower thresholds will increase the rate of speed of change.

It is worth noting that the change in LED power is described as +1 or −1 in the algorithm above. This corresponds to a step in light change. A step in light change can be defined as the minimum amount of change that can be applied to an LED driver. It will be readily understood that this depends on the LED driver and electrical characteristics. For instance, if LED light is in the range of 0% to 100% then a step may be defined as a 1% change. The step change could be defined differently depending on the requirements of the robot, or the desires of the user. The light level step is a balance between desired light output and smoothness of transition. The light step should be small enough so the user cannot notice the light changes but also should be quick enough that illumination can reach maximum light level in acceptable time for image processing.

Alternatively, instead of incremental changes to the LED power, if a larger change to the LP were to be calculated, then this could be sent to the LED driver in discrete levels to give the impression of a smooth increase to the user.

Whilst particular embodiments have thus far been described, it will be understood that various modifications including those described above may be made without departing from the scope of the invention as defined by the claims.

The invention claimed is:

1. A vision system for a mobile robot, the vision system comprising:
   a lens module;
   an illumination system comprising a plurality of light sources; and
   a lens module holder is positioned around the lens module to allow the lens module to extend upward through the lens module holder, the lens module holder comprising a flange that projects radially outwards from the outside of the lens module holder,
   wherein a reflective surface is positioned on a surface underneath the flange, the reflective surface capable of reflecting light emitted from the illumination system away from the lens module.

2. The vision system of claim 1, further comprising a vision system mount for mounting the vision system to a mobile robot, the vision system mount comprising a plurality of holes through which the plurality of light sources protrude.

3. The vision system of claim 2, wherein the vision system mount comprises a heat sink to draw heat away from the plurality of light sources.

4. The vision system of claim 1, wherein the plurality of light sources are arranged in a ring around the lens module.

5. The vision system of claim 1, wherein each of the plurality of light sources are positioned below the reflective surface of the lens holder module.

6. The vision system of claim 1, wherein the reflective surface is a semi-parabolic toroid mirror.

7. The vision system of claim 1, wherein a fin is provided between each of the plurality of light sources.

8. The vision system of claim 7, wherein each fin is provided on a vision system mount for mounting the vision system to a mobile robot, the vision system mount comprising a plurality of holes through which the plurality of light sources protrude.

9. The vision system of claim 1, further comprising a light-transmissive cover.

10. The vision system of claim 9, wherein the light-transmissive cover covers the illumination system and defines an aperture through which a top of the lens module protrudes.

11. The vision system of claim 1, wherein the lens module holder protrudes above an upper surface of a body of the mobile robot.

12. The vision system of claim 1, wherein each of the plurality of light sources are positioned below an upper surface of a body of the mobile robot.

13. The vision system of claim 1, wherein the lens module comprises a plurality of lenses for focusing light onto an image sensor.

14. The vision system of claim 1, wherein there are eight light sources, and each light source is independently controllable.

15. A mobile robot comprising:
   a cleaner head through which air can be drawn into the mobile robot; and
   a vision system comprising:
      a lens module protruding above a top surface of the mobile robot;
      an illumination system below the top surface of the mobile robot, the illumination system comprising a plurality of light sources;
      a lens module holder positioned around the lens module, the lens module holder comprising a reflective surface for reflecting light emitted from the illumination system away from the lens module, wherein the reflective surface extends above the top surface of the mobile robot and at least partially faces downward toward the plurality of light sources.

* * * * *